Nov. 20, 1962 D. J. CRIMMINS 3,065,445

SOCKET CONNECTOR FOR FLEXIBLE TAPE CONDUCTOR CABLE

Filed May 26, 1960 3 Sheets-Sheet 1

INVENTORS
D.J. CRIMMINS
BY
Harry [signature]
ATTORNEY

Nov. 20, 1962 D. J. CRIMMINS 3,065,445

SOCKET CONNECTOR FOR FLEXIBLE TAPE CONDUCTOR CABLE

Filed May 26, 1960 3 Sheets-Sheet 2

INVENTOR.
D. J. CRIMMINS

BY Harry Bonner
ATTORNEY

Nov. 20, 1962 D. J. CRIMMINS 3,065,445

SOCKET CONNECTOR FOR FLEXIBLE TAPE CONDUCTOR CABLE

Filed May 26, 1960 3 Sheets-Sheet 3

INVENTOR.
D. J. CRIMMINS
BY
ATTORNEY

United States Patent Office 3,065,445

Patented Nov. 20, 1962

3,065,445
SOCKET CONNECTOR FOR FLEXIBLE TAPE CONDUCTOR CABLE

David J. Crimmins, Nutley, N.J., assignor to The Thomas & Betts Co., Elizabeth, N.J., a corporation of New Jersey Filed May 26, 1960, Ser. No. 31,872
3 Claims. (Cl. 339—176)

Figure 1:
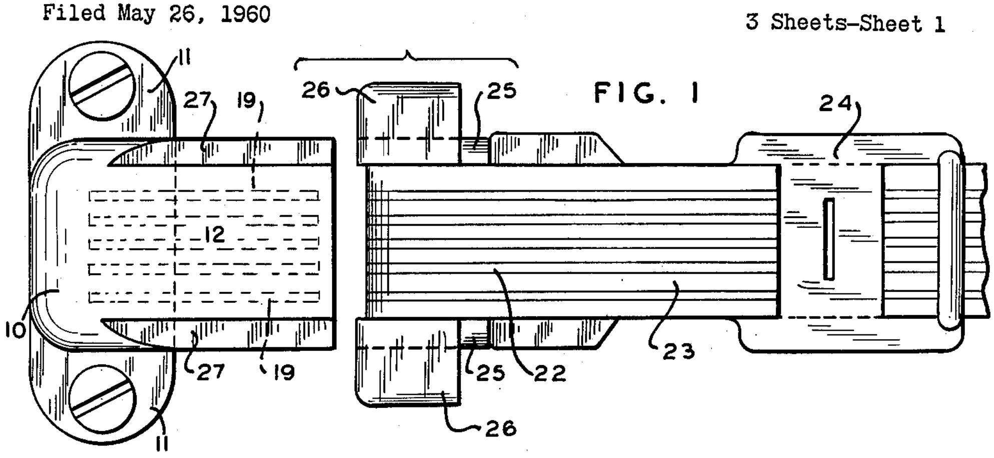

An object of the invention is to enable conductors such as flexible tape conductors, which are highly desirable and practical for many uses, to be readily interconnected or connected with conductors or electrical components of other types by the provision of a socket of novel construction including a planar extended wall against which the flexible tape conductor may be pressed to thereby effect electrical connection. The invention includes novel means for holding the tape conductor for ready connection to and disconnection from the socket casing in a rapid and convenient fashion while assuring direct and positive electrical connection at each such connection.

The drawings, illustrating procedures and devices useful in carrying out the invention, and the description below, are exemplary only of the invention, which is deemed to cover all other devices and procedures coming within the scope and purview of the appended claims.

Figure 2:
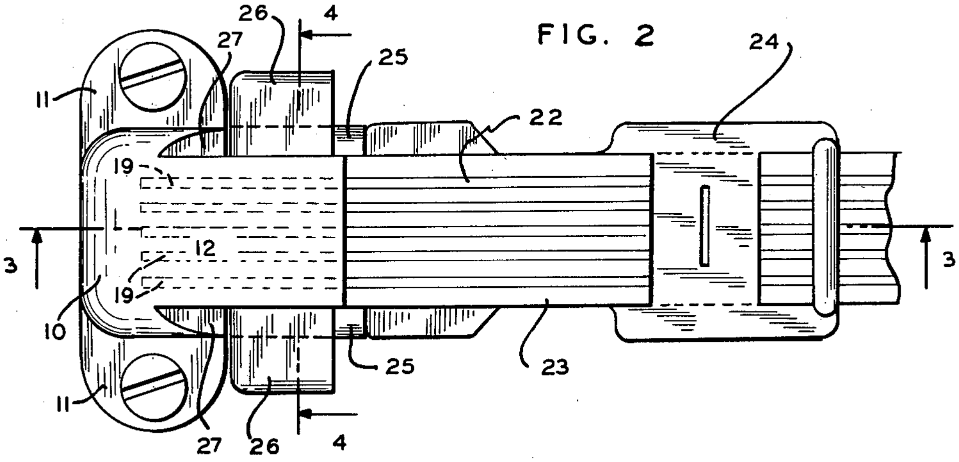
Figures 3, 4:
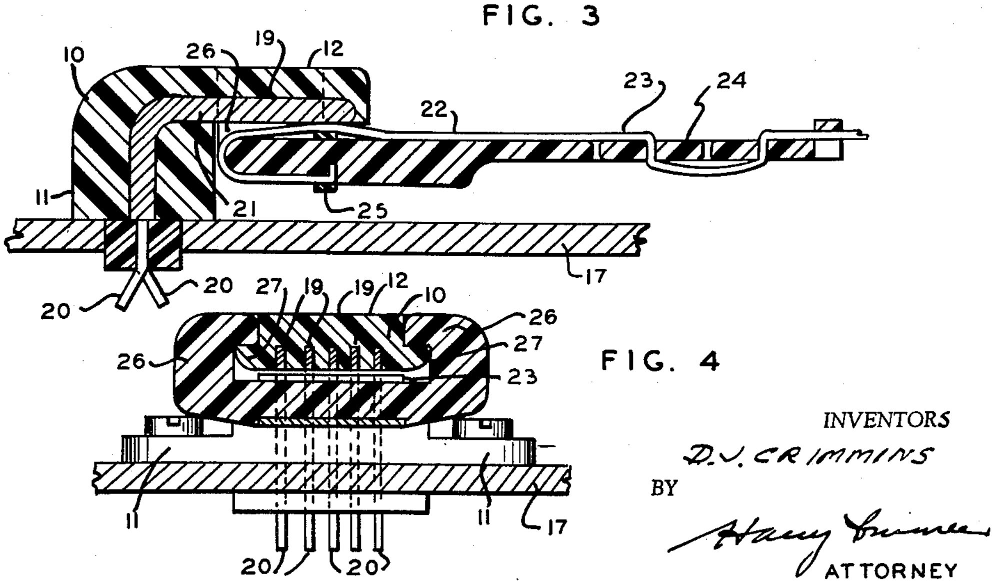
Figures 5, 6, 7, 8, 9, 10, 11:
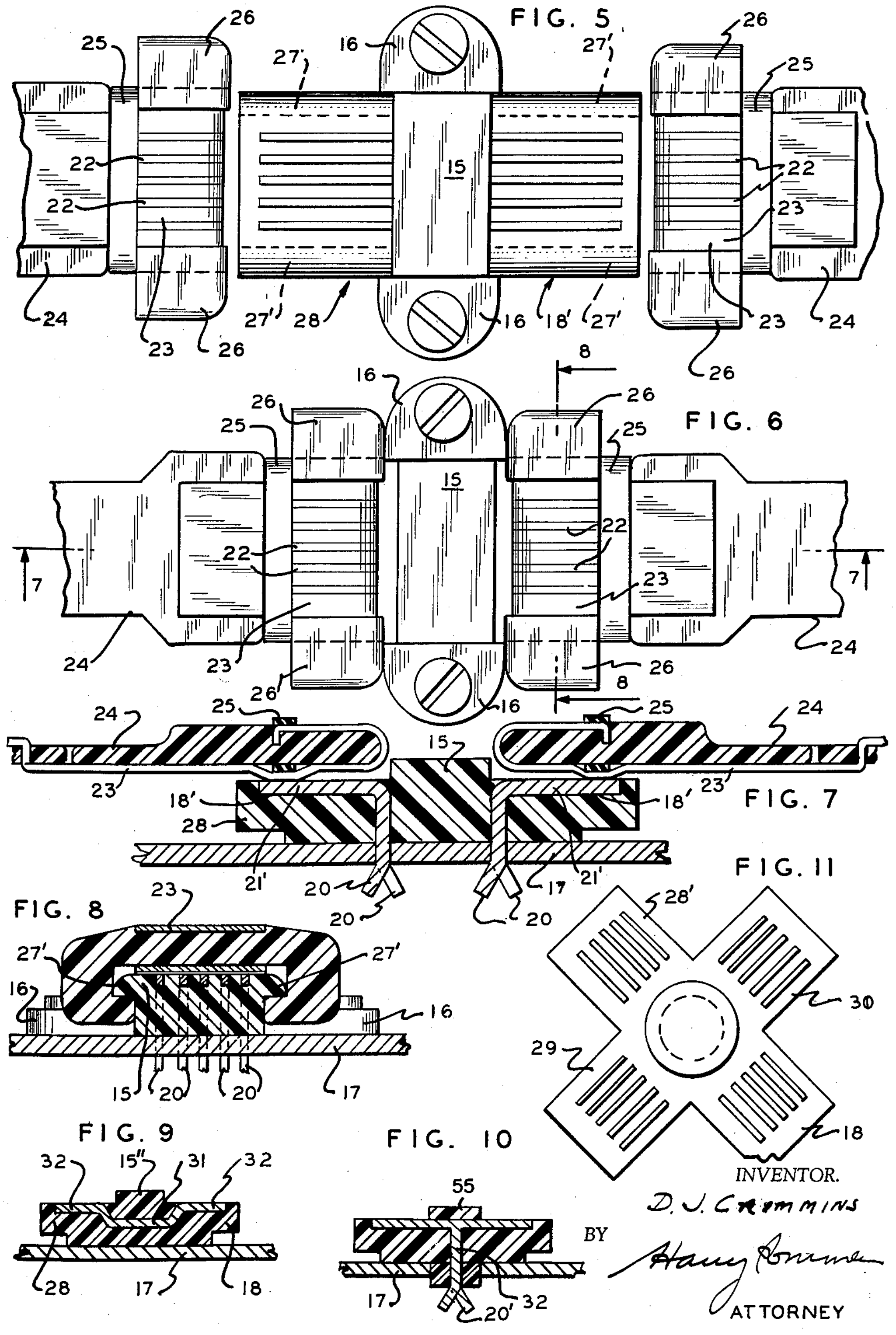
Figures 12, 13, 14, 15, 16, 17, 18, 19, 20:
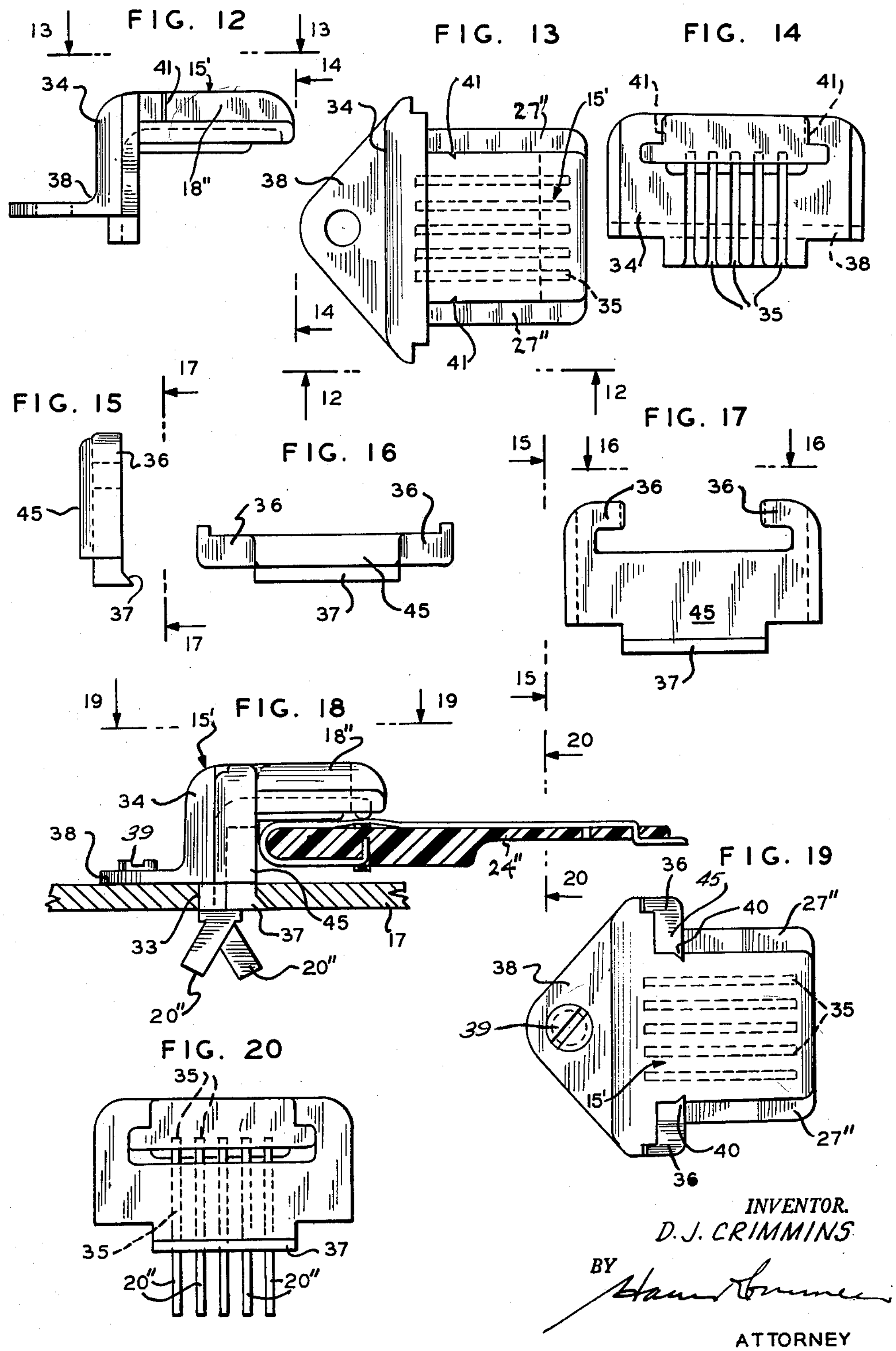

In the drawings, wherein similar reference characters indicate like parts:

FIG. 1 is a top plan view of a socket casing and a tape conductor provided with interconnecting means pursuant to the invention, shown separated, FIG. 2 is a similar view of said parts shown assembled, FIG. 3 is a longitudinal sectional view, taken at line 3—3 of FIG. 2 (the parts beyond the actual section being omitted), FIG. 4 is a transverse sectional view, taken at line 4—4 of FIG. 2, FIG. 5 is a plan view of a further form of socket casing and conductors embodying the invention shown separated, FIG. 6 is a similar view showing the parts connected, FIG. 7 is a longitudinal sectional view, taken at line 7—7 of FIG. 6 (the parts beyond the actual section being omitted), FIG. 8 is a transverse sectional view, taken at line 8—8 of FIG. 6, FIGS. 9 and 10 are longitudinal sectional views, similar to FIG. 7, of further forms of sockets embodying the invention, FIG. 11 is a plan view of a further form of socket casing embodying the invention, FIG. 12 is a side elevational view, taken at line 12—12 of FIG. 13, of the base portion of a socket member fabricated of two or more parts, of another form of the invention, FIG. 13 is a top plan view thereof, taken at line 13—13 of FIG. 12, FIG. 14 is an end elevational view thereof, taken at line 14—14 of FIG. 12, FIG. 15 is a side elevational view of the wire retainer portion of said socket member, FIG. 16 is a top plan view thereof, taken at line 16—16 of FIG. 17, FIG. 17 is an end elevational view thereof, taken at line 17—17 of FIG. 15, FIG. 18 is a side elevational view of the assembled socket member formed of the base and wire retainer parts shown in FIGS. 12 and 15, shown positioned in the opening of a panel, the latter being shown cross-sectionally, FIG. 19 is a top plan view thereof, taken at line 19—19 of FIG. 18, and FIG. 20 is an end elevational view taken at line 20—20 of FIG. 18.

As shown in the drawings, the invention comprises a socket casing 10 (FIG. 1) adapted to be secured to a suitable fixed support 17 at one end 11 and having a flat wall 12 extended from (FIG. 3) the other end thereof and disposed in spaced relation to the first mentioned end 11. One or more conductors 19 are fixed to the casing (FIG. 3) being molded or otherwise embedded in or secured to the casing 10 and terminating at 20 beyond the chassis or other support 17 for electrical connection and alternately angularly disposed if desired to prevent short circuiting (FIG. 3), the opposite ends 21 of the conductors being disposed in the casing in planar contact relation to the flat wall 12 of the casing 10. Conductors 22 are conventionally formed insulated within flexible tapes 23; the portions of said conductors to be electrically connected with the casing conductors 19 are first bared to effect the direct connection (FIG. 3) on assembly of the parts as presently described. The flexible tape 23 is secured as by bands 25 (FIGS. 1 and 3) to plates 24 which may have means such as C-shaped marginal ears 26 slidably engaging marginal rails 27 of casing 10 (FIGS. 4 and 2) to slide the flexible tape 23 into contacting engagement with the conductors 19 on the wall 12 of the casing 10. Said wall 12 may be formed with the rail 27 at the lower face thereof (FIGS. 3 and 4) in planar extension 12, in which case the plate 24 and tape 23 are positioned beneath the wall 12.

In a reverse arrangement shown in FIGS. 5–8, rails 27′ are at the top of extension 18′ (away from the chassis) and the conductors 21′ are at the top of the extension. Plug 24 is inverted so that conductors 22 of tapes 23 are exposed at the bottom of the plug (FIGS. 7 and 8). A second wall 28 may be formed on the casing 15 for connection of a plurality of flexible tapes 23 carried by the plates 24 therewith; another multi-planar extension device is shown in FIG. 11 with planar extensions 18, 28′, 29 and 30, for connecting a plurality of conductors to a socket casing. Where two or more planar walls are thus provided on a casing 55, they may be connected to a single conductor (FIG. 10) having an end 20′ beyond the chassis 17 or as shown in FIG. 9, if it is desired to interconnect the tape conductors, a conductor 31 is secured within the socket casing 15″ with the ends 32 thereof disposed in contact relation at the planar wall of the casing.

In the form of invention shown in FIGS. 12–20, the socket casing 15′ (FIGS. 12 and 18) to be inserted into the opening 33 in the chassis or panel 17 comprises base portion 34 having the flat wall 18″ provided with marginal rails 27″ with which a plate 24″ (FIG. 18) may have interengagement in a manner corresponding with that shown in FIGS. 3 and 4, as will be apparent by reference thereto. Base portion 34 is provided with grooves 35 (FIGS. 13 and 14) to receive the wires 20″; said wires and base portion 34 may be positioned in a suitable tool for assembly with the retainer 45, which is provided with marginal ears 36 (FIGS. 16, 17 and 19) to engage the rails 27″ of base portion 34, and protuberance 37 extending from the retainer angularly to snap into the opening 33 in the panel 17 and interlock therewith. In addition, the base member 34 may have a flange 38 extended from the lower end thereof cooperating with the protuberance 37 to engage the top and bottom faces of panel 17. Thus, different sizes of casings 15′ (with their correspondingly different sizes of protuberances) may be positioned in standard openings 33 in panel 17 and interlocked therewith. The marginal ears 36 of the retainer plate 45 may be provided with inwardly directed bosses 40 (FIG. 19) to interengage with recesses 41 (FIG. 13) in the socket casing 15' adjacent the rails 27" to interlock the parts when the retainer 45 is positioned against the base portion 34. The aperture 33 may be made much larger than required to receive the retainer 45 and its protuberance 37 and the latter may engage the underside of the support 17 while the flange 38 may engage the upper side of said support, and bolt, screw or other means 39 passed through flange 38, thus enabling use of standard apertures 33 which may be made larger than usually required.

Having thus described my invention, what I claim as new and desire to secure by Letters Patent is:

1. A socket casing for connection of conductors comprising a casing having an elongated first wall and means to secure one end of said first wall to a support surface, a second wall secured to the opposite end of the first wall and extending therefrom to define therewith essentially an L-shape, a conductor fixed to the casing and disposed in contact position at the underside of the second wall thereof, a flexible conductor tape having a bared conductor portion to be electrically connected with the conductor fixed to the casing, an elongated plate to which said tape conductor is secured, and complementary registering means on the plate and second wall for slidably moving the plate into close registration with the underside of the second wall to thus electrically connect the conductor fixed to the casing and the tape conductor.

2. In a socket casing as set forth in claim 1, said complementary means including protuberance and recess means for interengagement in a plane at substantially right angles to the longitudinal axis of the second wall on registration of the plate therewith, to interlatch the plate with the casing in registration position.

3. In a socket casing as set forth in claim 1, means intermediate the plate and the flexible tape thereon to yieldably urge the flexible tape away from the plate and thus into yieldable engagement with the underside of the second wall of the casing on registration of the plate therewith.

References Cited in the file of this patent

UNITED STATES PATENTS

| | | |
|---|---|---|
| 2,284,462 | Williams | May 26, 1942 |
| 2,530,354 | Hayslett | Nov. 14, 1950 |
| 2,566,805 | Lavander | Sept. 4, 1951 |
| 2,858,515 | Thunander et al. | Oct. 28, 1958 |
| 2,897,254 | Dickinson | July 28, 1959 |

FOREIGN PATENTS

| | | |
|---|---|---|
| 216,045 | Switzerland | July 31, 1941 |